(12) United States Patent
Smith et al.

(10) Patent No.: US 7,721,755 B2
(45) Date of Patent: May 25, 2010

(54) VALVE FOR CONTROLLING THE FLOW OF FLUIDS

(75) Inventors: Mark A. Smith, Plainfield, IL (US); James Richards, Dassel, MN (US)

(73) Assignee: DS Smith Plastics Limited, Maidenhead (GB)

( * ) Notice: Subject to any disclaimer, the term of this patent is extended or adjusted under 35 U.S.C. 154(b) by 580 days.

(21) Appl. No.: 11/043,672

(22) Filed: Jan. 26, 2005

(65) Prior Publication Data

US 2006/0162785 A1 Jul. 27, 2006

(51) Int. Cl.
*F16K 3/24* (2006.01)
*F16K 35/04* (2006.01)

(52) U.S. Cl. .................. 137/384; 251/264; 222/185.1

(58) Field of Classification Search .............. 222/185.1, 222/513, 514; 251/215, 218, 264, 324; 137/384
See application file for complete search history.

(56) References Cited

U.S. PATENT DOCUMENTS

| | | | | |
|---|---|---|---|---|
| 1,681,981 A | * | 8/1928 | Gilbert | ........................ 251/215 |
| 1,912,304 A | * | 5/1933 | Phillips | ........................ 222/513 |
| 2,657,006 A | * | 10/1953 | Drow | ........................... 251/218 |
| 3,062,496 A | * | 11/1962 | Stehlin | ........................ 251/218 |
| 3,226,079 A | * | 12/1965 | Shaw et al. | .................. 251/218 |
| 3,370,827 A | * | 2/1968 | Stehlin | ........................ 251/14 |
| 3,434,694 A | * | 3/1969 | Skinner | ........................ 251/215 |
| 3,493,146 A | | 2/1970 | Conners et al. | |
| 4,052,998 A | * | 10/1977 | Robinson | .................. 137/625.5 |
| 4,351,455 A | | 9/1982 | Bond | |
| 4,478,242 A | | 10/1984 | Bond | |
| 4,619,377 A | | 10/1986 | Roos | |
| 5,435,339 A | * | 7/1995 | Hayes | .................... 137/315.04 |
| 5,445,298 A | | 8/1995 | Strong | |
| 5,570,818 A | | 11/1996 | Strong | |
| 5,967,381 A | * | 10/1999 | van Zeeland et al. | ........ 222/325 |
| 6,131,767 A | * | 10/2000 | Savage et al. | .................. 222/1 |
| 6,299,027 B1 | | 10/2001 | Berge et al. | |
| 6,321,948 B1 | * | 11/2001 | Bellon et al. | ........... 222/153.14 |
| 6,491,189 B2 | | 12/2002 | Friedman | |
| 6,742,680 B2 | | 6/2004 | Friedman | |
| 6,789,707 B2 | | 9/2004 | Wright | |
| 6,808,454 B2 | | 10/2004 | Gerrard et al. | |
| 2004/0135113 A1 | | 7/2004 | Roos | |

* cited by examiner

*Primary Examiner*—John Fox
(74) *Attorney, Agent, or Firm*—Rockey, Depke & Lyons, LLC

(57) ABSTRACT

A valve assembly to dispense fluid from fluid containers including a member that is rotatably slideable in a tube between open and closed positions. The valve assembly utilizes sealing beads to provide seals so that fluid cannot be dispensed from the assembly when the assembly is in the closed position. The valve assembly also includes a tamper evident indicator to show a user whether or not the valve assembly has been previously actuated. The tamper evident indicator may include a tab that is broken when the valve assembly is first actuated. The tamper evident indicator may also include a skirt that either detaches from a knob or fractures when the valve assembly is first actuated.

14 Claims, 5 Drawing Sheets

VALVE FOR CONTROLLING THE FLOW OF FLUIDS

BACKGROUND OF THE INVENTION

This invention relates to valve assemblies utilized with containers that can control the flow of fluids being dispensed from such containers and specifically valve assemblies having tamper evident devices that show users that the valve assembly has either been previously actuated or tampered with.

Valve assemblies for dispensing fluid from containers, systems or other sources are known in the art. Such valve assemblies, for example, are widely used with containers for dispensing liquids such as wine, syrups, juices, teas and other like beverages. Trouble-free, easy-to-use and reliable valve assemblies are significant considerations in such dispensing applications. Additionally, as valve assemblies are typically disposed of along with their containers once the contained fluid has been consumed, it would be desirable for the valves to be recyclable. Moreover, since most of the valve assemblies are disposed after use, the cost of manufacturing the valve assemblies is a significant factor.

One type of valve assembly commonly used includes push body closures in which a cap or spout having a dispensing aperture is used to dispense fluid by applying a force to pull or push the aperture to a dispensing position. Some of those prior art valve assemblies generally include relatively complex and involved structures which are difficult to manufacture, such as by molding processes, and/or include fragile elements which are susceptible to breakage.

Another type of valve assembly known in the prior art utilizes a tap feature wherein a tap is rotated between open and closed positions to dispense fluid. Valve assemblies having such tap features generally have ridges or protrusions that mate with grooves and/or seats to provide seals that stop fluid from being dispensed when the valve assemblies are in the closed position. To ensure that those types of valve assemblies do not leak when used, the assemblies must be manufactured so as to provide a tight seal between the ridges and the grooves or seats. Thus, during manufacture great care is taken to make certain that the ridges and their respective grooves mate properly. Such efforts add to the costs of producing such assemblies as well as increasing the complexity of such designs. It is also a known disadvantage that such valve assemblies with the tap feature have a propensity to open during transportation either because of inadvertent actuation or vibration.

Moreover, all of the prior art valve assemblies present safety concerns. Neither the assemblies nor containers employ a feature or device to indicate that the containers have been tampered with or that some or all of the fluid has been lost by prior actuation of the valve assemblies.

SUMMARY OF THE INVENTION

The present invention may be used in the food service, beverage and/or chemical industry or any use where fluid containers are stored and then transported to a final destination where the fluid is dispensed from the container. It should also be understood that the valve assembly can be used in both liquid and gas applications. A typical fluid container is a "bag-in-box" packaging container; however, other fluid containers may be used. The "bag-in-box" container includes a collapsible plastic bag filled with a liquid that is contained in a cardboard box. The valve assembly is generally assembled to the bag at the filler and then shipped to the end user. The end user or operator can either dispense the liquid directly from the container or connect it to another dispensing system using a suitable connector.

In one embodiment of the invention, the valve assembly includes a tube having first and second open ends with an inlet opening coming into the tube shaft between the two open ends. Preferably, the inlet opening is closer to the first open end. The tube includes at least two sealing beads which are continuous protrusions around the inside wall of the tube. At least one sealing bead is located between the first open end and the inlet opening; and at least one sealing bead is also located between the second open end and the inlet opening. The tube additionally includes two protrusions on the outside wall of the tube near the second opening.

A member having a knob at one end may also used in the valve assembly of the present invention. The knob preferably includes two grooves such that when the member is inserted into the tube, the walls of the tube engage the knob, and the protrusions and the grooves cooperate so that the member can rotatably slide between open and closed positions.

When the valve assembly of the present invention is in the closed position, the sealing beads are in contact with the sides of the member providing a seal so that fluid flow from the inlet is blocked. When the valve assembly is in the open position, the member rotatably slides away from the inlet, removing the seal between the sealing bead and the member near the first open end so that fluid is able to be dispensed from that end. While in the open position, the sealing bead near the second open end of the tube maintains its seal so that fluid does not escape through the second open end.

It should be appreciated that the member of the valve assembly can be tapered so that, as the member rotatably slides into the closed position, the sealing beads of the tube exert a greater force onto the sides of the member providing a tighter seal.

Thus, one object of the present invention is, therefore, to provide a valve assembly which is reliable, relatively inexpensive, easy to manufacture and easy-to-use. It is a further object to provide a valve assembly that includes a tamper evident feature whereby a user can quickly determine whether the valve assembly has been previously actuated or tampered with. Additionally, it is further object to provide a valve assembly that is connected to the container and ready-to-use which cannot be inadvertently actuated during storage or transportation.

In another embodiment of the present invention, the sealing beads are placed on the sides of the member of the valve assembly so that the sealing beads provide a sealing contact with the inside walls of the tube. It should also be appreciated that the inside walls of the tube could be tapered so, as the member rotatably slides into the closed position, the sealing beads exert a greater force onto the inside walls of the tube providing a tighter seal.

It should also be appreciated that, in order to prevent accidental actuation of the valve assembly while it is in either the open or closed position, detents can used in conjunction with the protrusions and grooves of the knob.

It is a further object of the present invention to provide a tamper evident indicator so that a user can quickly see whether the valve assembly was previously opened or tampered with. In one embodiment of the invention, the tamper evident indicator is a skirt that is attached to the knob so that when the valve assembly is first actuated, the skirt can either detach itself from the knob or the skirt can fracture so that the user can quickly determine whether or not the valve assembly has been previously actuated.

In another embodiment of the invention, the tamper evident indicator is one or more tabs located inside one or all of the grooves of the knob so that when the valve assembly is in the closed position, the tabs are located adjacent to the protrusions. When the valve assembly is first actuated the tabs will break, evidencing to a user that the valve assembly has been previously actuated. The tabs can partially or fully bridge the groove.

It should also be appreciated that the tamper evident indicators described above can be used to prevent accidental actuation of the valve assembly.

With all of the above described embodiments of the present invention, the valve assemblies are easy to produce and simple to assemble as the tube and the member can be snap fitted together. Moreover, the valve assemblies of the present invention are simple to use and are relatively inexpensive. And, since all of the valve assembly can be made utilizing plastic the assembly is easily recyclable.

Additional features and advantages of the present invention are described in, and will be apparent from, the drawings included herein and the Detailed Description of the Invention.

DETAILED DESCRIPTION OF THE INVENTION

Figure 1:
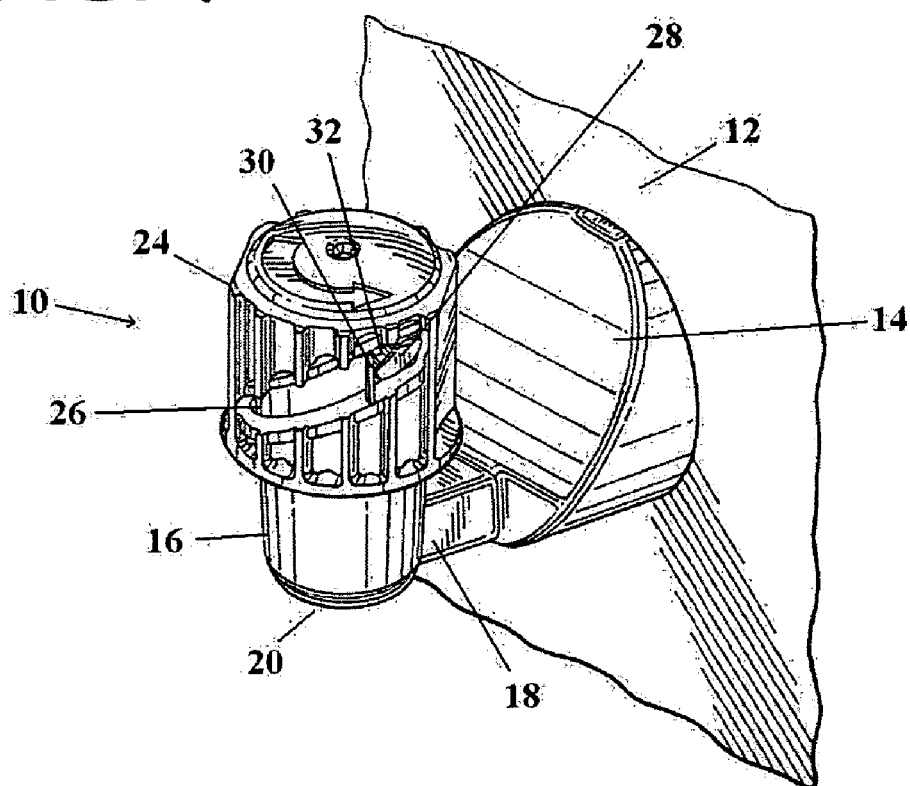
FIG. 1 is a perspective view of one embodiment of the valve assembly attached to a fluid container utilizing a tab within the grooves of the knob as a tamper evident indicator.

One embodiment of the valve assembly 10 of the present invention has a configuration as shown in FIG. 1 in which the assembly 10 is already connected to a fluid container 12. In this embodiment the valve assembly 10 is fully assembled and may be attached to the fluid container 12 a number of ways. It may be mechanically attached to a suitable outlet of the fluid container 12 or the valve assembly 10 may be directly attached to the container 12. In the embodiment shown in FIGS. 1 through 4, the valve assembly 10 includes a housing 14 that is sealed to a wall of the fluid container 12. The valve assembly 10 may be made of plastic or other suitable materials.

The valve assembly 10 also includes an open tube 16 that is connected to the housing 14 by an inlet 18 through which fluid can flow from the container 12. The inlet 18 is connected near a first open end 20 of the tube 14; it is through this first open end that fluid is dispensed from the valve assembly 10. The valve assembly 10 also includes a member 22 (FIGS. 3, 4, 5) which has a knob 24 that is attached to one end of the member 22. The knob 24 can be any device that can be easily rotated by a user. In one embodiment, the knob 24 includes two grooves 26 that are located on opposite sides of the knob 24. When the member 22 is inserted into the tube 16, two protrusions 28 located on the outside wall of the tube 16, near the second open end, are fitted into the grooves 26 as shown in FIG. 1. The grooves 26 are angled in such a way that the member 22 slides within the tube 16 when the knob 24 is rotated. As shown in FIG. 1, the protrusions 28 are visible to the user when they are within the two grooves 26 of the knob 24.

In the valve assembly 10 shown in FIG. 1 there is also included a tamper evident indicator in the form of tabs 30 located in grooves 26 of the knob 24. When the valve assembly 10 is initially in the closed position, the tabs 30 are located near or preferably adjacent to the protrusions 28 such that when the valve assembly 10 is first actuated by turning the knob 24, the protrusions 28 break the tabs 30 evidencing that the valve assembly 10 had been actuated. The tabs 30 can either fully bridge the grooves 26, as shown in FIG. 1, or can partially bridge the grooves 26. The tabs 30 may also serve an additional purpose of initially locking the valve assembly 10 into the closed position so that during shipment the valve assembly 10 is not inadvertently opened or actuated.

Figure 2:
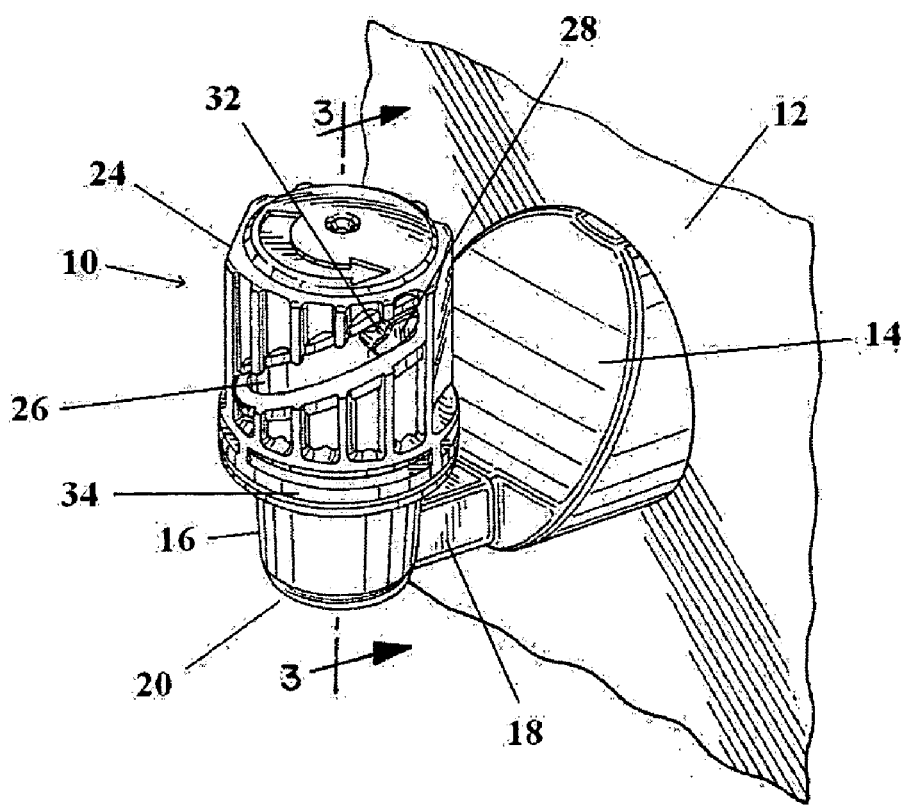
FIG. 2 is a perspective view of one embodiment of the valve assembly attached to a fluid container utilizing a skirt connected to the knob as a tamper evident indicator.

Another embodiment of the valve assembly 10 is shown in FIG. 2, wherein the tamper evident indicator is in the form of a skirt 34 connected to the knob 24. That embodiment also includes a flange 36 located on the outside wall of the tube 16. When the knob 24 is first rotated to actuate the valve assembly 10, the skirt 34 detaches from the knob 24, evidencing that the valve assembly 10 has been actuated. This is clearly shown in FIGS. 3 and 4, where the valve assembly is in the closed position in FIG. 3 and in the open position in FIG. 4. The skirt 34 is attached to the knob 24 in FIG. 3 and detached in FIG. 4. In this embodiment, when the skirt 34 is detached it rests on flange 36 on the outside wall of the tube 16.

Detachment of the skirt 34 from the knob 24 during actuation can be accomplished in a number of ways. One way is to have projections (not shown) on the skirt 34 that engage the wall of the tube 16 so that the skirt 34 cannot be rotated in conjunction with the knob 24. When the knob 24 is rotated the projections engage the wall of the tube 16 exerting a force onto the skirt 34 which results in detaching it from the knob 24 evidencing that the valve assembly 10 has been actuated. Another way of detaching the skirt 34 is to provide projections (not shown) on the outside wall of the tube in such a manner that when the knob 24 is rotated the projections sever a plurality of strips 38 attaching the skirt 34 to the knob 24. In other embodiments of the present invention, the skirt 34 may fracture, evidencing that the valve assembly 10 has been actuated.

As with the previous embodiment, the skirt 34 may also serve the additional purpose of locking the valve assembly 10 into the closed position so that during shipment the valve assembly 10 does not inadvertently open.

Figure 3:
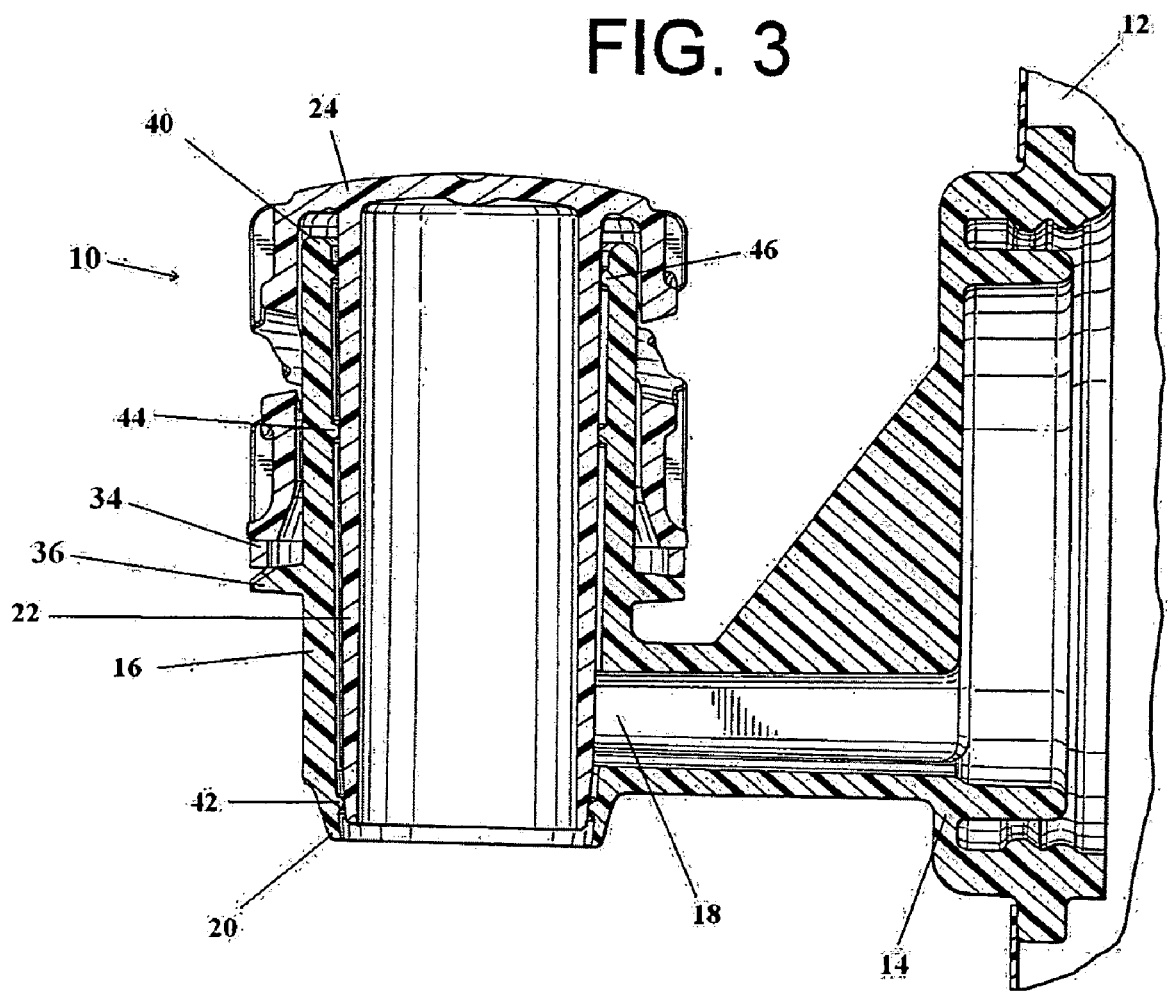
FIG. 3 is a sectional view of the valve assembly utilizing the skirt attached to the knob wherein the valve assembly is in a closed position.

When the member 22 is fitted into the tube 16, the second open end 40 of the tube 16 fits into a groove 26 formed by the knob 24 and the outside of the member 22. At the same time, the protrusions 28 near the second open end 40 of the tube 16 fit into the grooves 26 of the knob 24. FIG. 3 illustrates the interaction between the member 22 and the tube 16. The valve assembly 10 illustrated in FIG. 3 is in the closed position. In that position, the valve assembly 10 provides a seal around an inlet 18 so that fluid is not dispensed from the container 12. That seal is provided by at least two sealing beads. In the embodiment shown in FIG. 3 to 6, three sealing beads 42, 44 and 46 are used.

The sealing beads 42, 44 and 46 are continuous protrusions or rings on the inside wall of the tube 16. The first sealing bead 42 is located between the first open end 20 of the tube 16 and the inlet 18. The second sealing bead 44 is located between the second open end 40 and the inlet 18. The third sealing bead 46 is located between the second sealing bead 44 and the second open end 40. In the closed position, the side of the member 22 and the sealing beads 42, 44 and 46 come together and provide a tight seal so that fluid cannot pass and fluid cannot be dispensed from the container 12. The sealing beads 42, 44 and 46 can be easily seen in FIG. 5.

In this embodiment the wall of tube 16 between the second open end 20 and the inlet 18 is tapered. This can be seen in FIG. 6 which shows an enlarged view of the valve assembly 10 in the closed position. The portion of the member 22 which is in contact with the first sealing bead 42 is also tapered. Such tapered regions interact to provide a tight seal as the member 22 slides into the closed position.

Figure 4:
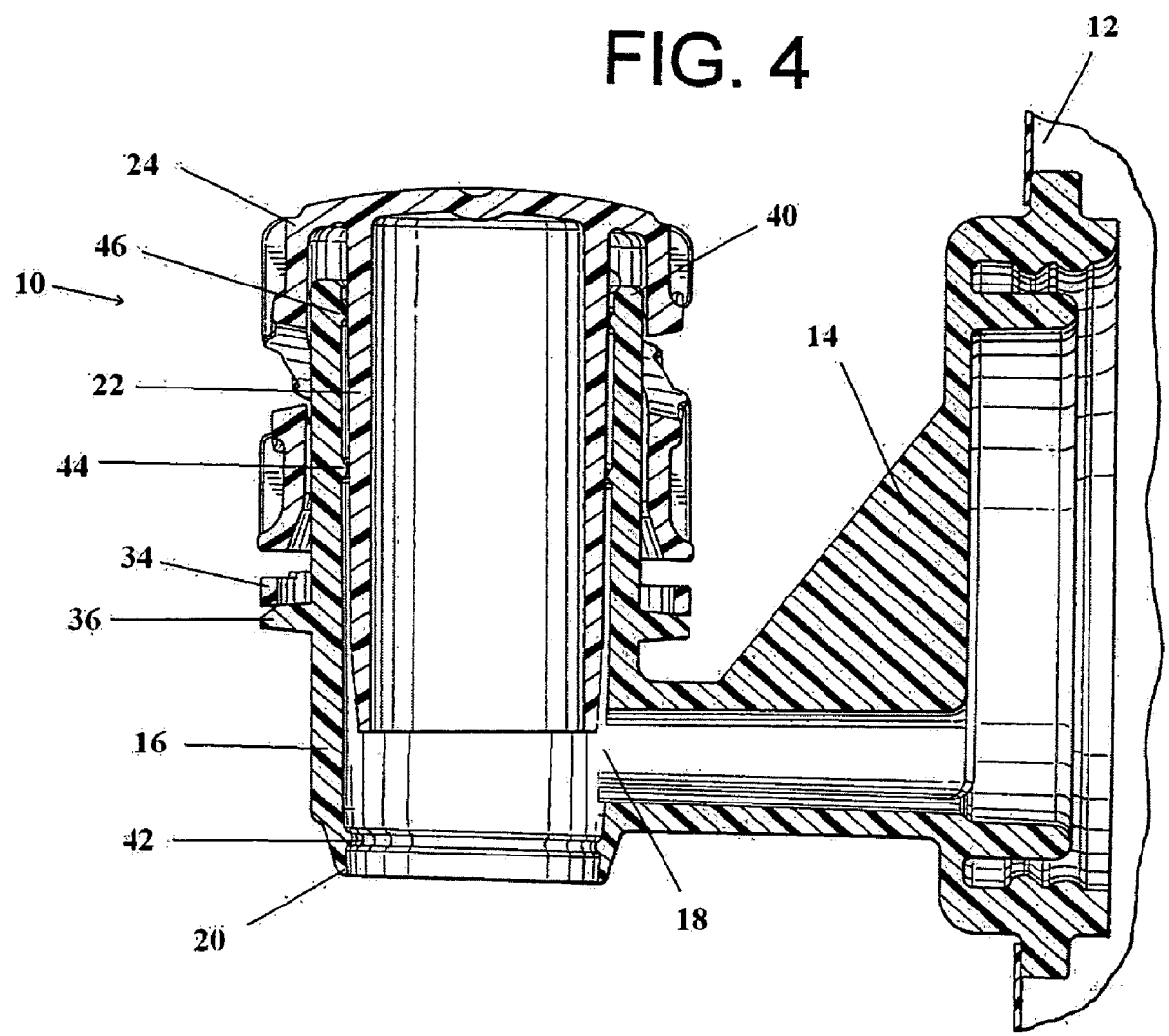
FIG. 4 is a sectional view of the valve assembly in an open position with the skirt detached from the knob.
Figure 5:
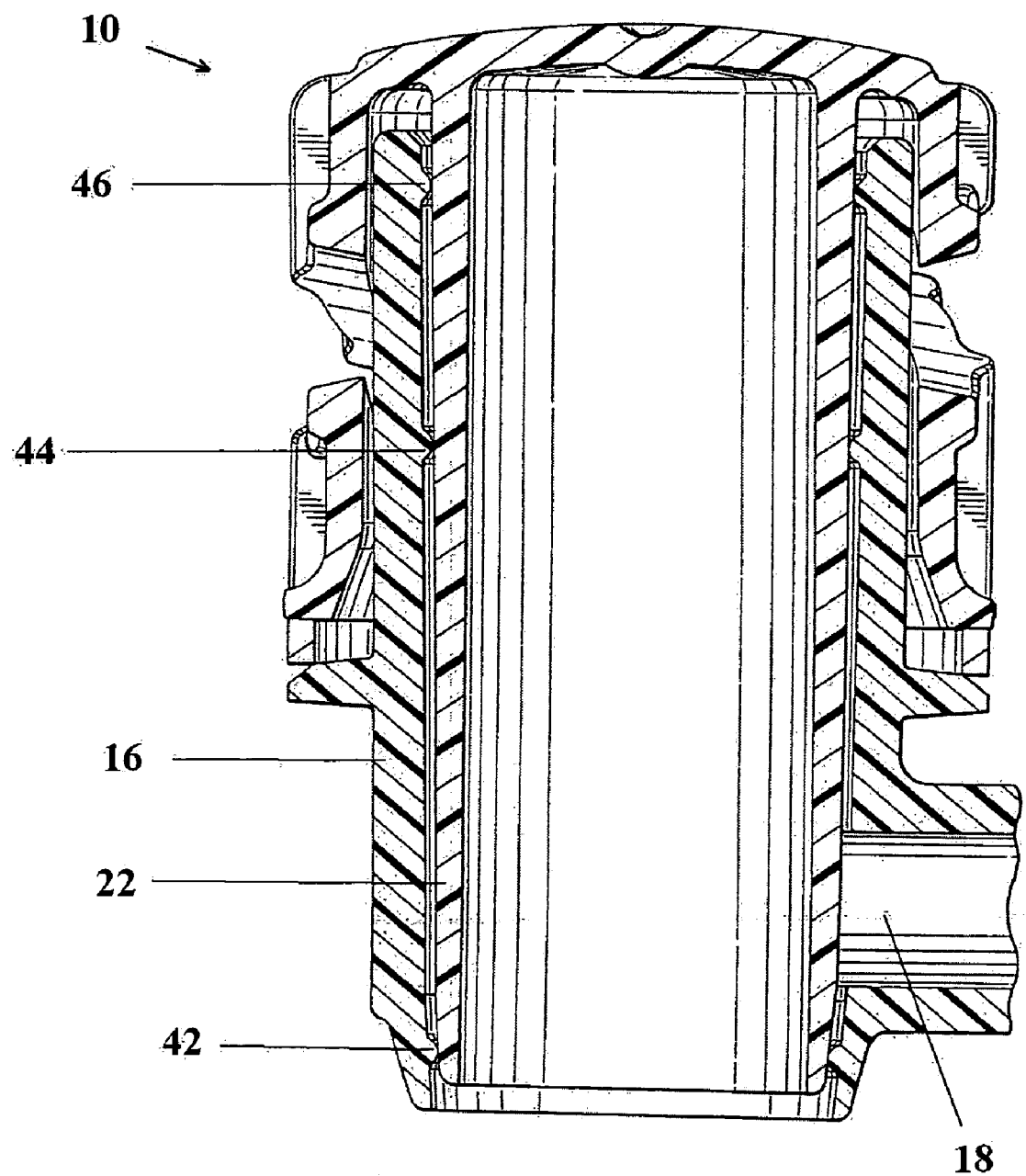
FIG. 5 is an enlarged sectional view of the tube of the valve assembly.
Figure 6:
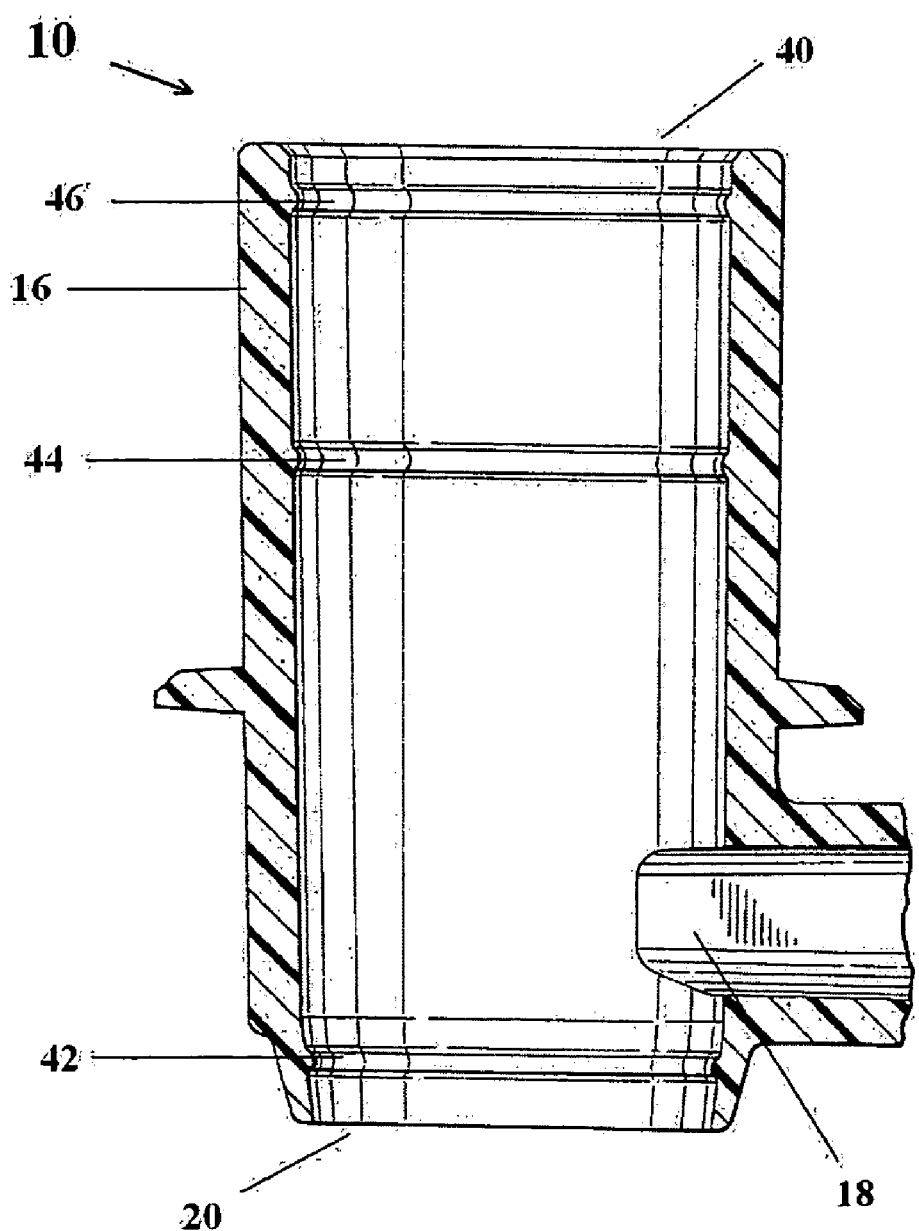
FIG. 6 is an enlarged sectional view of the tube.

To open the valve assembly 10, a user turns the knob 24 and the member 22 rotatably slides away from the inlet 18. The seal between the first sealing bead 42 near the first open end 20 of the tube 16 and the sides of the member 22 is then broken and the member 16 is removed from the inlet 18. When the valve is in the open position, the seals between the second and third sealing beads 44 and 46 and the member 22 remain so that fluid does not exit through the second open end 40 of the tube 16. Rather, fluid flows only through the first open end 20 of the tube 16. The open position of the assembly is shown in FIG. 4.

A detent 32 as shown in FIGS. 1 and 2 can be used to hold the valve assembly 10 in either the open or closed positions.

In another embodiment of the present invention, the entire member 22 and the entire tube 16 are tapered. As the member 22 slides into the tube 16, the seal between the sides of the member 22 and the sealing beads 42, 44 and 46 tighten. In yet another embodiment of the present invention, the sealing beads 42, 44 and 46 are on the side of the member 22 and, together with the wall of the tube 16, provide the seals in the valve assembly 10.

It should also be understood that the size of the sealing beads 42, 44 and 46 may vary depending on the dimensions of the member 22 and/or tube 16.

Although the present invention has been described with reference to specific embodiments, those skilled in the art will recognize that changes may be made thereto without departing from the spirit and scope of the invention as set forth in the hereafter appended claims.

The invention claimed is:

1. A valve assembly for controlling the flow of fluids from a container comprising:

a first tube having a cylindrical wall defining a first internal liquid flow path, a first open end of the tube being disposed oppositely a second open end;

a second tube having a cylindrical wall defining a second internal liquid flow path, an open third end of the tube being disposed oppositely an open fourth end, a fluid inlet formed in the cylindrical wall intermediate the third end and the fourth end and a fluid outlet formed at the fourth open end, the second open end of the first tube being attached to the fluid inlet such that the first internal liquid flow path is in fluid communication with the second internal liquid flow path, the second tube being transversely disposed to the longitudinal axis of the first tube, the second tube having a pair of circumferentially spaced protrusions extending from an outer surface of the second tube proximate the third end;

at least two sealing beads formed on an inside surface of the second tube and being integral therewith, a first sealing bead being located between the third end and the fluid inlet and a second sealing bead being located between the fourth end and the inlet; and a member mounted on the third end of the second tube for rotational movement about an axis of the second tube, the member having a first generally cylindrical wall and a second generally cylindrical wall coaxially disposed and spaced radially inwardly from the first cylindrical wall, the first cylindrical wall having a pair of grooves forming a spiral pattern from a bottom of the first cylindrical wall to a top of the first cylindrical wall, one of each of the pair of protrusions being positioned within one of each of the grooves, and wherein each of the grooves extends through the entire thickness of the first cylindrical wall and an end portion of the protrusions being visible, the first cylindrical wall and second cylindrical wall being integrally formed such that a first edge of the second cylindrical wall is connected to a first edge of the first cylindrical wall by a shoulder element, an opposing second edge of the first cylindrical wall defining an opening between the first and second cylindrical walls, an annular space between the first cylindrical wall and second cylindrical wall extending from the first edge to the second edge, the annular space being coaxially disposed about a portion of the third end of the second tube, and the second cylindrical wall extending axially within the second tube, the member is being moveable from a first, closed position where the second cylindrical wall seals a fluid flow path between the fluid inlet and the fluid outlet to a second open position where fluid is allowed to flow from the fluid inlet though to the fluid outlet.

2. The valve assembly of claim 1, wherein the inside surface of the second tube includes a third sealing bead between the second sealing bead and the third end and in a position perpendicularly offset from but laterally between first edge and second edge of the first cylindrical wall.

3. The, valve assembly of claim 1, wherein the second cylindrical wall has an outer surface that slidingly engages the inner surface of the second tube.

4. The valve assembly of claim 1, wherein a portion of the inner surface of the second tube proximate the fourth end tapers axially inwardly.

5. The valve assembly of claim 1, wherein each of the grooves has a first detent that receives one of each of the protrusions when the valve is in the closed position.

6. The valve assembly of claim 5, wherein each of the grooves has a second detent that receives one of each of the protrusions when the valve is in the open position.

7. The valve assembly of claim 1 which further includes a tamper indicator comprising at least one tab that is visible in at least one of said grooves and is broken when the valve is first actuated.

8. The tamper indicator of claim 7 wherein the tab bridges the groove.

9. The tamper indicator of claim 7 wherein each of the grooves includes at least one of the tabs.

10. The tamper indicator of claim 7 wherein the tamper indicator prevents unwanted actuation of the valve assembly.

11. The valve assembly of claim 1 which further includes a tamper indicator comprising a skirt that is attached to a peripheral portion of the first cylindrical wall.

12. The valve assembly of claim 11 wherein the skirt detaches from the first cylindrical wall when the valve is first actuated.

13. The valve assembly of claim 11 wherein the skirt fractures when the valve is first actuated.

14. The valve assembly of claim 11 wherein the tamper indicator prevents unwanted actuation of the valve assembly.

* * * * *